United States Patent [19]

Koyahata

[11] 4,455,640
[45] Jun. 19, 1984

[54] RECORD PLAYING DEVICE

[75] Inventor: Hiroshi Koyahata, Yokohama, Japan

[73] Assignee: Katoh Electrical Machinery Co., Ltd., Yokohama, Japan

[21] Appl. No.: 424,912

[22] Filed: Sep. 27, 1982

Related U.S. Application Data

[63] Continuation of Ser. No. 201,382, filed as PCT JP79/00300, Nov. 26, 1979, §102(e) date Jul. 15, 1980, abandoned.

[51] Int. Cl.³ ............................................. G11B 17/06
[52] U.S. Cl. .................................... 369/216; 369/226
[58] Field of Search ............... 369/216, 224, 226, 266

[56] References Cited

U.S. PATENT DOCUMENTS

| | | | |
|---|---|---|---|
| 3,822,889 | 7/1974 | Nakagawa | 369/216 |
| 4,072,874 | 2/1978 | Arnold | 369/226 |
| 4,113,263 | 9/1978 | Takizawa | 369/226 |
| 4,201,390 | 5/1980 | Koyahata et al. | 369/226 |

*Primary Examiner*—Steven L. Stephan
*Attorney, Agent, or Firm*—George B. Oujevolk

[57] ABSTRACT

The present invention relates to a record playing device adapted to be attached to a cabinet of a record player.

In order to facilitate the assembling of the record player as much as possible, the record playing device of the invention has a unit construction comprising a single base plate 1 which carries, at least: a turn table driving motor having a turn-table shaft and a pinion; a gear wheel for intermittent engagement with the pinion; a returning plate adapted to be moved reciprocatingly to the right and left in accordance with the rotation of the wheel gear; a sliding lever adapted to move reciprocatingly to the left and right to actuate link pawls pivoted to the gear wheel thereby to initiate the mutual engagement between the pinion and the wheel gear; and a microswitch for controlling the operation of the turn-table driving motor and adapted to be opened and closed in accordance with the positional relationship between the sliding lever and the returning plate.

According to an aspect of the invention, the pinion attached to the turn-table shaft is fitted around a boss of the turn-table, thereby to reduce the thickness of the cabinet of the record player as much as possible.

The present invention offers the following advantages: namely, the assembling of the record player is remarkably facilitated because the record playing section of the record player can be assembled simply by attaching the base plate to the cabinet of the record player and connecting the sliding lever at its one end to the operation plate attached to the tone-arm shaft. In addition, the overlapping of the pinion and the boss of the turn-table in the vertical direction is avoided to permit the thickness of the cabinet to be reduced correspondingly.

1 Claim, 10 Drawing Figures

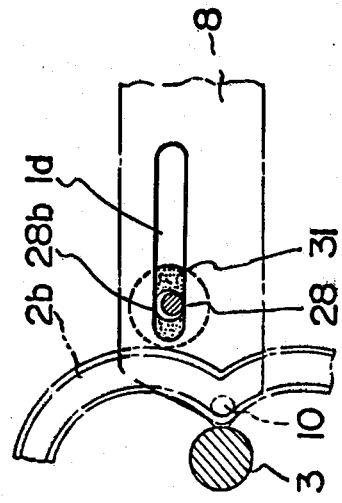
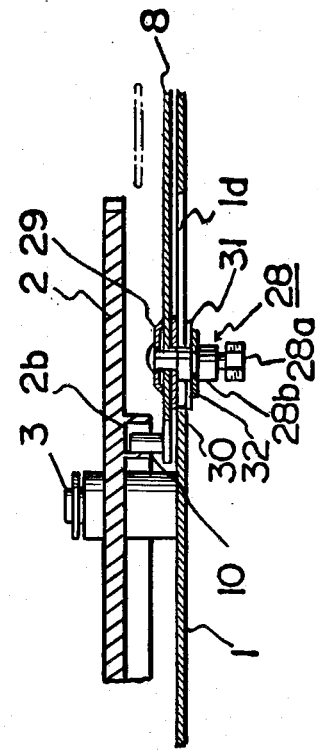

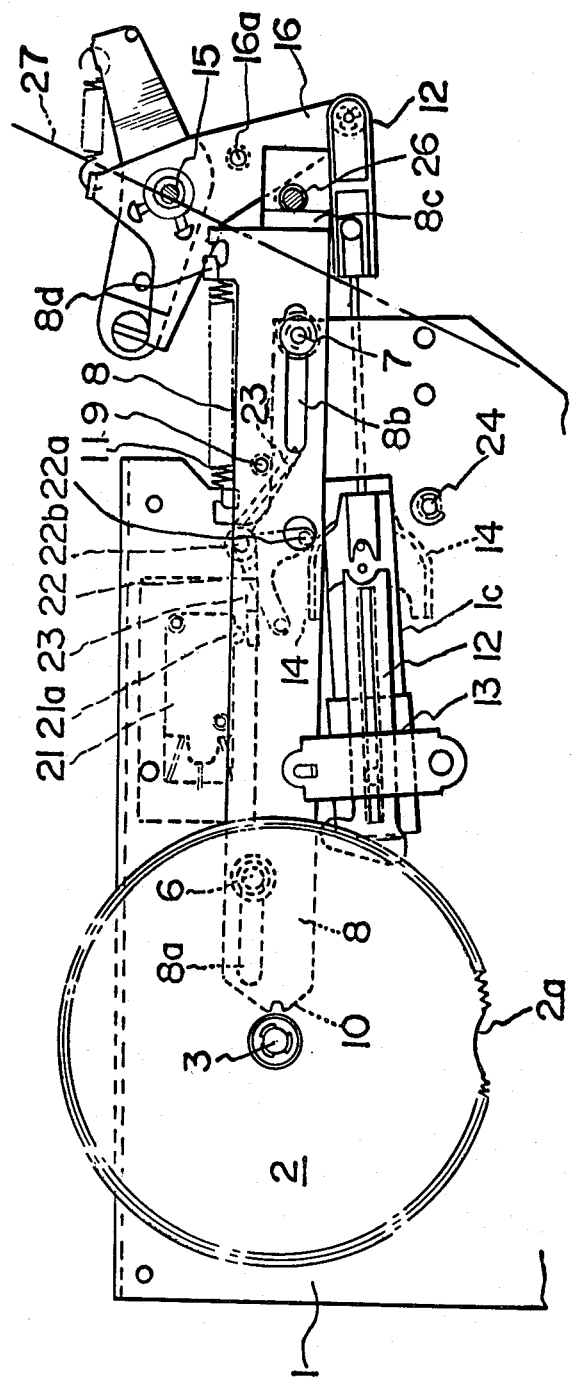

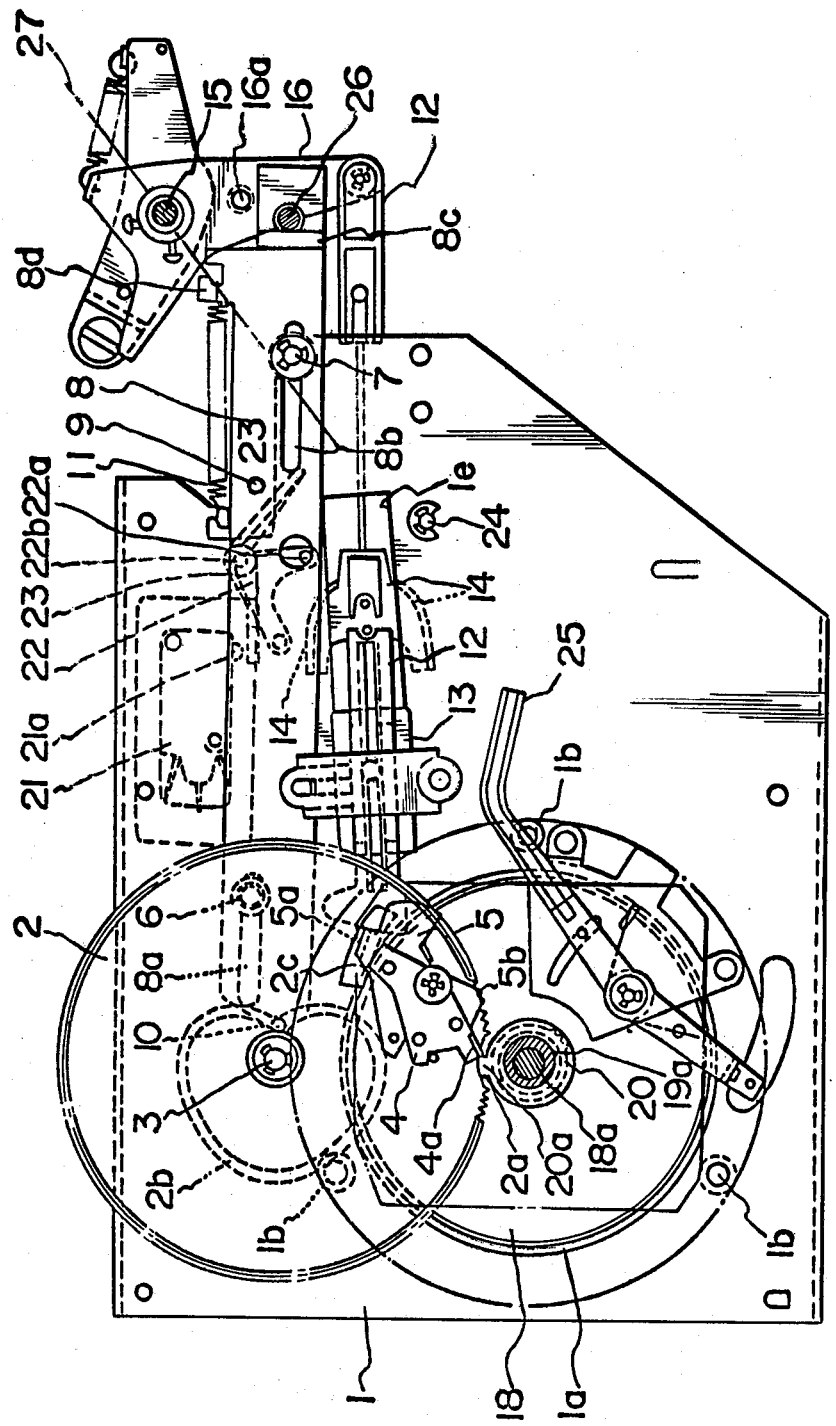

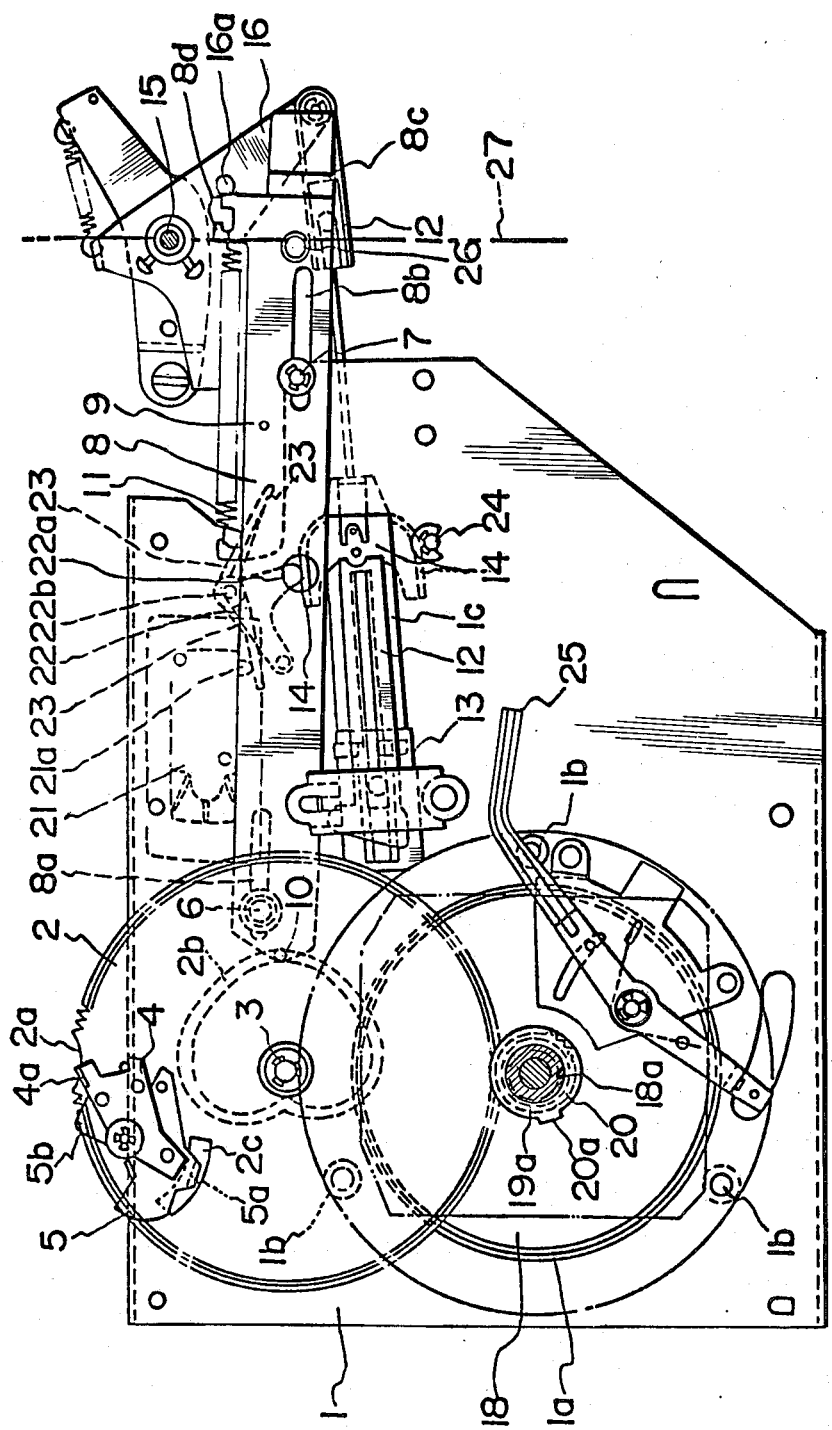

RECORD PLAYING DEVICE

This is a continuation of application Ser. No. 201,382 filed as PCT JP 79/00300, Nov. 26, 1979, § 102(e) July 15, 1980, now abandoned.

TECHNICAL FIELD

The present invention relates to a record playing device adapted to be attached to the cabinet of a record player.

BACKGROUND ART

It is well known that existing record playing devices have complicated mechanisms. This is true particularly in the record playing device which adopts such a turn-table driving system that the driving power for the turn-table is utilized also for auto-return mechanism for the tone-arm, because, such a type of device necessitates a driving power converting means for taking out the turn-table driving power for returning the tone-arm as required.

The use of record player is spreading also in the under-development countries. In view of transportation cost, tax and the like, it is an ordinary way to export the record player to those countries in the state of separate parts and then assemble the parts into the player unit in those countries.

Unfortunately, the standard of technic is not so high in the under-development countries. It is, therefore, often experienced that, if the record player is disassembled into too many separate parts, the record player does not operate satisfactorily after the assembling in those countries. This applies also to the record player manufacturers who purchase the parts separately from the parts makers and assemble the parts into record player units, even when such manufacturers have high level of technic.

Also, there is a current tendency to reduce the cabinet of the record player as thin as possible for obtaining an attractive appearance. To meet this demand, it is necessary to reduce the thickness of the record player device as much as possible.

DISCLOSURE OF INVENTION

The major object of the invention is to provide a record playing device which can operate correctly without encountering substantial technical difficulty after mere attaching of the same to a cabinet.

To this end, according to the invention, there is provided a unit type record playing device having at least a turn table driving motor including a turn-table shaft and a pinion, a wheel gear adapted to make an intermittent engagement with the pinion, a returning plate adapted to make a reciprocating movement to the right and left in accordance with the rotation of the wheel gear, a sliding lever movable to the right and left to drive a link pawl pivoted on the wheel gear to trigger the mutual engagement of the wheel gear and the pinion, and a microswitch adapted to be opened and closed in accordance with the positional relationship between the sliding lever and the returning plate and adapted to control the operation of the turn-table driving motor, all of the above-mentioned constituents being mounted on a single base plate.

This arrangement permits the record playing device to be assembled without substantial technical difficulty, by simply attaching the base plate to the cabinet of the record player and connecting the sliding lever to an operation plate attached to the tone-arm shaft, and to operate correctly for playing records.

Another technical object of the invention is to reduce as much as possible the thickness of the record playing device.

To achieve this subordinate technical subject, the invention provides a record playing device adopting a direct driving system for the turn-table and having a pinion fitted around a boss of a turn-table shaft in order to fit the turn-table to the turn-table shaft.

This arrangement eliminates the pulley which has been essential in the conventional device adopting an indirect turn-table driving system, and the superpositioning of the boss of the turn-table and the pinion in the thicknesswise direction is eliminated to make it possible to reduce the thickness of the record playing device.

BRIEF DESCRIPTION OF THE DRAWINGS

FIG. 6 is a partial sectional plan view of another form of holding pin for holding a returning lever;

FIG. 7 is a side elevational sectional view of the same part as that shown in FIG. 6;

FIG. 8 is a partial sectional plan view of the record playing device shown in FIG. 1 in the state of commencement of the record playing;

FIG. 9 is a plan view of the same portion of the record playing device showing the condition that record playing finished; and FIG. 10 is a plan view of the same portion of the record playing device showing the condition that the tone-arm has returned onto the arm rest by auto-return operation.

BEST MODE FOR CARRYING OUT THE INVENTION

Figure 1:
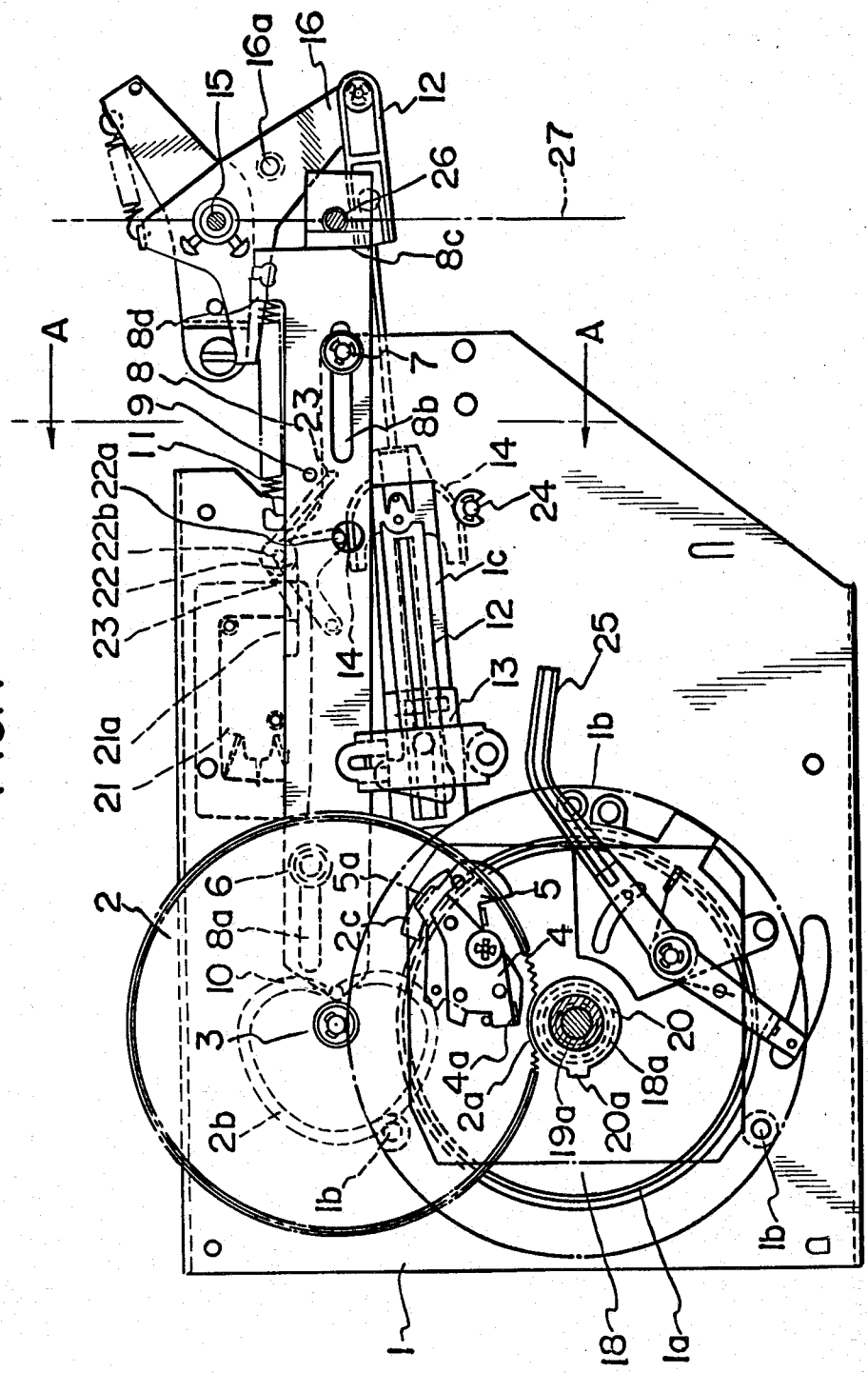
FIG. 1 is a plan view of a record playing device constructed in accordance with the invention.
Figure 2:
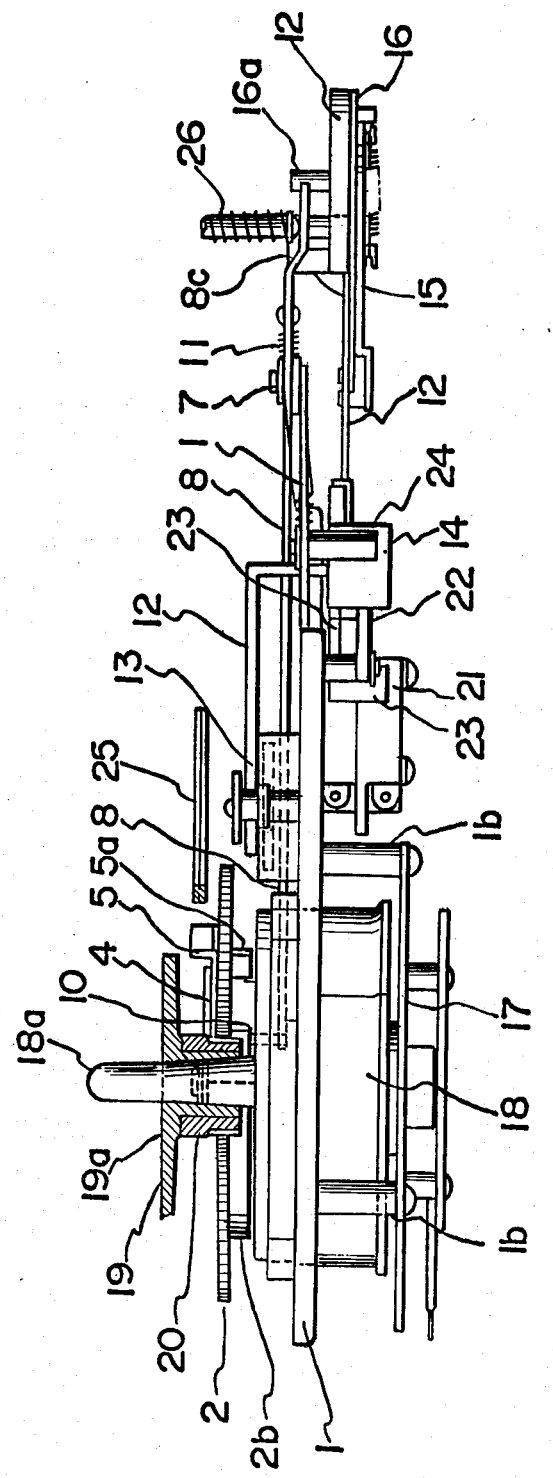
FIG. 2 is a side elevational view of the device shown in FIG. 1.
Figure 3:
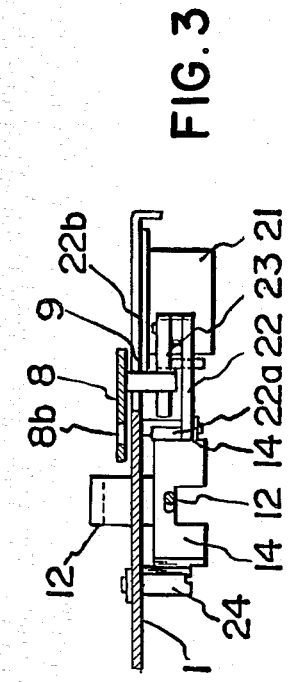
FIG. 3 is a sectional view taken along the line A—A of FIG. 1.
Figure 4:
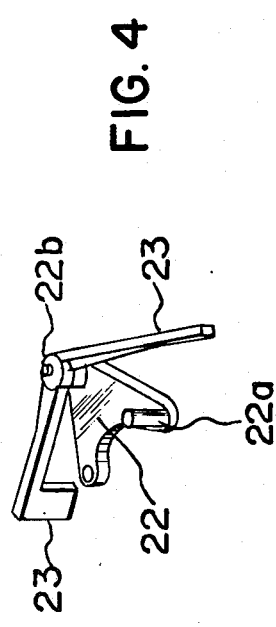
FIG. 4 is a perspective view of a switch controlling piece.
Figure 5:
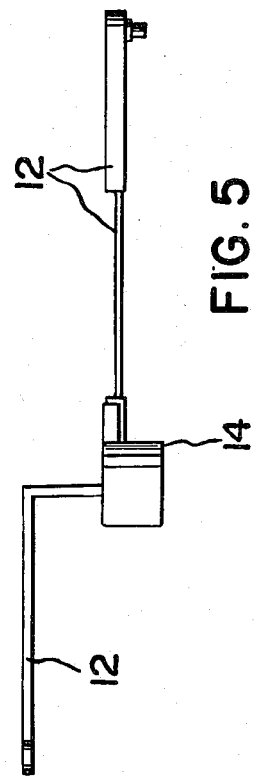
FIG. 5 is a side elevational view of a sliding lever.

The best mode for carrying out the invention will be described hereinunder with reference to the accompanying drawings. Referring to FIGS. 1 to 5, a reference numeral 1 denotes a base plate to which fixed is a shaft 3 to which rotatably attached is a wheel gear 2. The wheel gear 2 has a notched or recessed part 2a formed in its periphery and, and has a heart-shaped cam groove 2b formed in the lower surface thereof. Link pawls 4,5 are pivoted to one side of the upper face of the wheel gear near the recess 2a in an overlapped manner. The link pawl 4 is provided with an upwardly bent lug 4a for moving into and out of the recess 2a, while the other link pawl 5 is provided with a downwardly bent lug 5a which projects to the downside of the wheel gear 2 through an arcuate slot 2c formed in the wheel gear 2.

The base plate 1 further has holding pins 6,7 projected from the upper side thereof and adapted to be received by elongated holes 8a,8b formed in a returning plate 8 so that the returning plate 8 is supported movably to the right and left. The returning plate 8 has a bent portion 8c at its one side and an operation lug 8d formed in the vicinity of the bent portion 8c and extending horizontally. Further, a pressing pin 9 extending downwardly through a notch formed in the base plate 1 is formed substantially at the center of the returning plate 8. Also, an upwardly extending engaging pin 10 is formed at the left-side end portion of the returning plate 8. A tension coiled spring 11 is interposed between the operation lug 8d and the plate 1, and the engaging pin 10 is received at its end by the heart-shaped cam groove 2b formed in the wheel gear 2. Further, an elevation rod 26 of a tone arm 27 contacts at its lower end with the portion of the returning plate 8 near the bent portion 8c.

A holder 13 is attached to the upper surface of the base plate 1. A sliding lever 12 having a crank-like side elevation is received at its left-side end by the holder 13 in such a manner as to be able to move to the right and left. The central part of the sliding lever 12 extends to the lower surface of the base plate through an elongated hole 1c formed in the base plate and then extends in parallel with the lower surface of the base plate 1 to reach the operation plate 16 attached to the tone-arm shaft 15. Projections 14 projects forwardly and rearwardly from the central portion of the sliding lever 12 positioned under the base plate 1.

Also, a microswitch 21 associated with a motor 18 for directly driving the turn-table 19 is fixed to the lower side of the base plate 1.

In the area surrounded by the contact 21a of the microswitch 21, the projection 14 of the sliding lever 12 and the pressing pin 9 attached to the returning plate 8, disposed is a switch controlling driving member 22 having a substantially <-shaped plan and pivoted at its one end to the lower face of the base plate 1, the switch controlling driving member 22 having a pin 22a extending upwardly from its other end to contact with one side of the projection 14. Also, disposed in this area is a switch controlling driven member 23 having a substantially <-shaped plan and pivoted to the central portion of the switch controlling driving member 22, the switch controlling driven member 23 being contacted at its one side by the contact 21a and at its other end by the pressing pin 9. A stopper 24 having an eccentric portion projected downwardly to a level below the base plate 1 contacts the one side portion of the projection 14.

The base plate 1 has a large-diameter bore 1a for receiving the motor. Fixing pins 1b,1b,1b are extended downwardly from the periphery of the motor-receiving bore 1a. A motor carrying plate 17 attached to the ends of these pins 1b,1b,1b carries a motor 18 for directly driving the turn-table 19. The motor 18 is partly received by the bore 1a and projects to a level above the upper face of the base plate 1. The motor 18 has a rotor shaft which serves also as a turn-table shaft 18a which is fitted to a boss 19a formed unitarily with the turn-table 19. A pinion 20 is fitted around the boss 19a. The position of the pinion 20 is so determined previously that, in the normal state, the pinion 20 rotates in the recess 2a of the wheel gear 2 without meshing the latter.

A reference numeral 25 denotes a reject lever for actuating the automatic return device in the midst of record playing. The arrangement is such that, as the reject lever is pulled at its one end to make a counter-clockwise rotation, the other end of the same pushes the link pawl 5 to cause a rotation of the link pawl 4.

FIGS. 6 to 7 show another form of holding pin of the returning plate.

In the automatic returning mechanism of a type in which the returning force is derived from the driving power for driving the turn-table through gears, it is essential to arrange such that, after the completion of the returning, i.e. when the returning plate is returned to the starting position leaving the tone-arm to rest on the arm rest, the wheel gear is stopped at a constant rotational position, for otherwise the wheel gear and the pinion makes an erroneous engagement when the next record playing operation is started to operate in a wrong manner or the engagement between the wheel gear and the pinion is made at wrong position when the next automatic returning operation is made, resulting in a breakdown of the gears.

This modification of the holding pin affords a slight adjustment of the stopping position of the wheel gear. Referring again to the Figure, a holding pin 28, which has a head portion 28a and an eccentric barrel portion 28b, is attached to the returning plate 8 by caulking at its one end through the medium of a disk-like spring 29. The eccentric barrel portion 28b of this holding pin is received by an elongated bore 1d formed in the base plate 1. Reference numerals 30 and 31 denote washers, while an "E" ring is denoted by a numeral 32. It is possible to attach the holding pin 28 to the base plate 1. In such a case, the pin 28 is received by an elongated bore 8a formed in the returning plate. The function of this modified holding pin will be described later.

During the assembling of the record player, the base plate 1 is attached to the cabinet (not shown) in the illustrated manner, and the right-side end of the sliding lever 12 is connected to the operation plate 16 attached to the tone-arm shaft. By so doing, the following operation is ensured without substantial adjustment. Thus, according to the invention, it is possible to assemble the record player operable correctly and precisely, without requiring substantial technic or skill.

In addition, partly because the pulley is eliminated thanks to the use of the direct driving motor 18, and partly because the pinion is fitted around the boss 19a of the turn-table 19, it is possible to reduce the thickness of the record playing device.

The operation of the record playing device of the invention will be described hereinunder with specific reference to the drawings.

FIG. 8 shows the record playing device in the state of starting of the record playing. As the tone-arm 27 shown by an imaginary line is lifted and swung toward the turn-table, the operation plate 16 is rotated clockwise to cause a leftward sliding motion of the sliding lever 12 connected to the operation plate 16. As a result, the projection 14 is spaced from the switch controlling drive member 22 so that the contact 21a of the microswitch 21 is released from the pressure exerted by the switch controlling driven member 23. In consequence, the microswitch 21 is turned on to start the motor 18 for directly driving the turn-table 19 to commence the playing of the record. In this state, the pinion 20 rotates freely within the recess 2a of the wheel gear 2, so that the wheel gear 2 does not rotate.

After the completion of the record playing, the stylus attached to the end of the tone-arm 27 is slided along the lead-out groove in the disc at a large radial pitch. As a result, as shown in FIG. 9, the sliding lever 12 comes to push the lug 5a of the link pawl 5 at its left-side end to rotate the pawl 5, so that the link pawl 4 is rotated counter-clockwise to project its lug 4a into the recess 2a. In consequence, the lug 4a contacts an engaging projection 20a formed on the pinion 20 to cause a slight counter-clockwise rotation of the wheel gear 2. Therefore, the wheel gear 2 engages with the pinion 20 and begins to rotate counter-clockwise and the returning plate, which is received at its one end by the cam groove 2b, is moved to the right overcoming the force of the tension coiled spring 11. Thereafter, the bent portion 8c lifts the elevation rod 26 of the arm lifter to raise the end of the tone-arm 27 and, then, the operation lug 8d pushes a projection 16a formed on the operation plate 16 to reset the tone-arm 27 to an arm rest (not shown) through a rotation of the tone-arm shaft 15. This state of the record playing device is shown at FIG. 10.

Just before the resetting of the tone-arm 27 to the starting position, one side of the projection 14 of the sliding lever, which moves to rightward together with the tone-arm 27, pushes the switch controlling drive member 22 toward the microswitch 21. However, since the pressing pin 9 for controlling the movement of the switch controlling driven member 23 has been moved to the right as illustrated in FIG. 10, the switch controlling driven member 23 is rotated counter-clockwise and does not press the contact 21a of the microswitch 21, so that the microswitch 21 is never turned off.

Therefore, the direct driving motor 18 continues to rotate, so that the returning plate 8, whose holding pin 10 is received by the cam groove 2b of the wheel gear 2 rotating in accordance with the rotation of the pinion 20, is moved to the left, guided by the cam groove 2b. Consequently, the returning plate 8 is returned to the starting position shown in FIG. 1 rapidly by the rotation of the wheel gear 2 and the pulling force of the tension coiled spring 11.

At the end period of the leftward movement of the returning plate 8, the pressing pin 9 presses one end of the switch controlling driven member 23 so that the latter tends to rotate the switch controlling driving member 22 in the clockwise direction. However, since the pin 22a of the switch controlling drive member 22 is already contacted by one side of the projection 14, the driving member 22 is prevented from being rotated. As a result, the switch controlling driven member 23 is rotated clockwise around the supporting shaft 22b and presses at its other end the contact 21a to turn the microswitch 21 off. The stopper 24 functions to prevent the sliding lever 12 from being deflected and escape.

Simultaneously with the turning off of the microswitch 21, the direct driving motor 18 is stopped, but the holding pin 10 provided at the end of the returning plate 8 drops without fail into the correct portion of the heart-shaped cam groove 2b due to the tensile force of the tension coiled spring 11, thereby to stop the wheel gear 2 at a constant rotational position. Therefore, erroneous engagement between the pinion 20 and the wheel gear 2 is avoided even when the pinion 20 starts to rotate together with the turn-table 19 for the next record playing operation. The pinion 20 idles in the recess 2a and correctly meshes with the wheel gear 2 when the next automatic returning operation is made.

The modification shown in FIGS. 6 and 7 affords, as stated before, an adjustment of the stopping position of the wheel gear 2 as required. As the head 28a of the holding pin 28 is rotated in either direction by means of a suitable tool, the eccentric barrel portion 28b of the holding pin 28 fitting the elongated bore 1d causes a slight movement of the portion of the returning lever 8 carrying the holding pin 10 in the forward or backward direction, so that the correct stopping position of the wheel gear 2 is finely adjusted without substantial technical difficulty.

On the other hand, at the end period of the engagement of the pinion 20 and the wheel gear 2, the end 5b of the link pawl 5, projecting to the teeth portion of the wheel gear 2, is pushed by the peripheral part of the pinion 20 to cause a clockwise rotation of the link pawl 4 to retract the lug 4a from the recess 2a. Therefore, the automatic return mechanism does not operate by the next operation of the direct driving motor 18.

As has been described, according to the invention, it is possible to assemble a record player which operate correctly, merely by attaching the record playing device to a cabinet and connecting the sliding lever 12 to an operation plate 16 and, as necessitated, making a slight adjustment, without requiring substantial technic or skill.

What is claimed is:

1. In a record player having a turn-table (19) for supporting a record disc, a tone-arm (27) horizontally and vertically movable, mounted on a tone-arm shaft (15), and, an operation plate (16) fixed to said tone-arm shaft; a tone-arm returning mechanism for returning the tone-arm to an arm rest after completion of record playing, said tone-arm returning mechanism comprising, in combination:

(a) a base plate (1) designed to be affixed onto a cabinet, said plate having a large diameter bore (1a) and an elongated bore (1c);
   (b) a direct driving motor (18) for said turn-table, fixed to said base plate and received in said large diameter bore (1a), said motor having a turn-table shaft (18a) fitted to a low boss (19a), formed unitarily with said turn-table, a pinion (20) fitted around said low boss, overlapping in the horizontal direction;
   (c) a wheel gear (2) pivotally mounted on the upper face of said base plate for intermittent engagement with said pinion (20), said wheel gear having a heart-shaped cam groove (2b) and link pawls (4, 5) pivotally mounted thereon;
   (d) a returning plate (8) reciprocally mounted on said base plate, said returning plate having a bent portion at one end portion thereof, an engaging pin at another end portion thereof, and an operation lug (8d) for pushing said operation plate in one direction after completion of record playing, said engaging pin being engaged with said cam groove;
   (e) an elevation rod vertically slidable mounted between said tone-arm and said bent portion;
   (f) a sliding lever (12) reciprocally mounted on a holder (13) fixed to said base plate, one end portion of said sliding lever being pivotally connected with said operation plate, said sliding lever having a crank-shaped side elevation receiving said elongated bore so that said sliding lever cooperates with said tone-arm and actuates said link pawls (4, 5) to initiate the mutual engagement between said pinion and said wheel gear;
   (g) a microswitch (21) affixed to said base plate for controlling the operation of said turn-table drive motor, switch controlling members for controlling said microswitch including a microswitch control drive member (22) pivoted to said base plate and a switch control driven member (23) pivoted to said drive member and said control driven member being operated by a pressing pin (9) projecting from said sliding lever, so that said microswitch is turned "OFF" when said returning plate and said sliding lever occupy a predetermined position before record playing and turned "ON" when one of said returning plate and said sliding lever is moved; and, (h) a holding pin (28), tightly pivoted to said returning plate, holding pin having an eccentric barrel portion (28b) received by the elongated bore (1c), so that as an engagement point between said engaging pin and said cam groove is slightly changed by rotating said holding pin, a stopping position of said wheel gear is slightly adjusted.

* * * * *